United States Patent
Kato

(10) Patent No.: US 10,710,290 B2
(45) Date of Patent: Jul. 14, 2020

(54) MOLD PLATEN, MOLD CLAMPING DEVICE, INJECTION MOLDING DEVICE

(71) Applicant: U-MHI PLATECH CO., LTD., Nagoya-shi, Aichi (JP)

(72) Inventor: Naoki Kato, Nagoya (JP)

(73) Assignee: U-MHI PLATECH CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 16/603,030

(22) PCT Filed: Oct. 6, 2017

(86) PCT No.: PCT/JP2017/036488
§ 371 (c)(1),
(2) Date: Oct. 4, 2019

(87) PCT Pub. No.: WO2019/069451
PCT Pub. Date: Apr. 11, 2019

(65) Prior Publication Data
US 2020/0189161 A1    Jun. 18, 2020

(51) Int. Cl.
*B29C 45/17* (2006.01)
(52) U.S. Cl.
CPC .................................. *B29C 45/1744* (2013.01)
(58) Field of Classification Search
CPC .......................... B29C 45/1744; B29C 45/64
See application file for complete search history.

(56) References Cited

U.S. PATENT DOCUMENTS

| 3,302,556 A | * | 2/1967 | Durbin | B29C 45/1744 |
| | | | | 100/214 |
| 6,027,329 A | | 2/2000 | Nazarian et al. | |
| 7,318,721 B2 | * | 1/2008 | Spicer | B29C 45/1744 |
| | | | | 100/295 |

(Continued)

FOREIGN PATENT DOCUMENTS

| JP | 3648178 B2 | 5/2005 |
| JP | 2005-205819 A | 8/2005 |

(Continued)

OTHER PUBLICATIONS

PCT/ISA/210, "International Search Report for International Application No. PCT/JP2017/036488," dated Nov. 7, 2017.

*Primary Examiner* — James P Mackey
(74) *Attorney, Agent, or Firm* — Manabu Kanesaka; Benjamin Hauptman; Kenneth Berner

(57) ABSTRACT

A mold platen includes a mold plate to which a mold is attached, a rear-surface plate provided opposite to the mold plate, coupling portions configured to be coupled to respective tie rods at four corners of the mold plate and the rear-surface plate, a cylindrical rib that is provided between the mold plate and the rear-surface plate and is located at a center part of the mold plate and the rear-surface plate, a diagonal reinforcing rib that is provided between the mold plate and the rear-surface plate and is configured to connect the cylindrical rib and each of the coupling portions, and a longitudinal/lateral reinforcing rib that is provided between the mold plate and the rear-surface plate and extends from the cylindrical rib along a position between the adjacent coupling portions.

10 Claims, 9 Drawing Sheets

(56) References Cited

U.S. PATENT DOCUMENTS

| | | | | |
|---|---|---|---|---|
| 7,491,051 | B2* | 2/2009 | Matsushita | B22D 17/266 |
| | | | | 264/328.9 |
| 7,798,805 | B2* | 9/2010 | Teng | B22D 17/26 |
| | | | | 425/472 |
| 8,163,218 | B2* | 4/2012 | Kato | B29C 45/68 |
| | | | | 264/255 |
| 8,550,800 | B2* | 10/2013 | Miyagawa | B29C 45/73 |
| | | | | 264/255 |
| 9,314,950 | B2* | 4/2016 | Senga | B29C 45/1744 |
| 9,738,020 | B2* | 8/2017 | Murata | B29C 45/1744 |

FOREIGN PATENT DOCUMENTS

| | | |
|---|---|---|
| JP | 2009-66774 A | 4/2009 |
| WO | 1998/41380 A1 | 9/1998 |

\* cited by examiner 6b-6b CROSS-SECTION 6a-6a CROSS-SECTION

MOLD PLATEN, MOLD CLAMPING DEVICE, INJECTION MOLDING DEVICE

RELATED APPLICATIONS

The present application is National Phase of International Application No. PCT/JP2017/036488 filed Oct. 6, 2017, the disclosure of which is hereby incorporated by reference herein in its entirety.

TECHNICAL FIELD

The present invention relates to a mold platen to which a mold is attached, a mold clamping device, and an injection molding device.

BACKGROUND ART

In a mold clamping device of an injection molding device or a die-casting machine, a fixed mold platen and a movable mold platen are disposed to face each other, and the movable mold platen is moved forward and backward by an actuator such as a hydraulic cylinder so as to approach and move away from the fixed mold platen. Further, a fixed mold is attached to the fixed mold platen, and a movable mold is attached to the movable mold platen. A resin or a metal is injected into a cavity formed between the fixed mold and the movable mold, which results in a molded article in a predetermined shape.

The injection molding device and the die-casting machine each include a large fixed mold platen and a large movable mold platen corresponding to a dimension of a mold. To produce a large molded article, the mold platen is also inevitably increased in size. Note that each of the fixed mold platen and the movable mold platen is also referred to as a mold platen except for a case where it is necessary to distinguish the fixed mold platen and the movable mold platen.

To increase the size of the mold platen, it is necessary to reinforce the mold platen in order to prevent deformation of the mold platen particularly on mold attachment surface side. As an example of mold platen reinforcement, for example, a structure in which a rib is provided on rear surface side of the mold platen opposite to the mold attachment surface disclosed in Patent Literature 1 and a structure in which the mold platen is formed in a box shape and a rib is provided inside the mold platen disclosed in Patent Literature 2 are well-known.

The mold platen disclosed in Patent Literature 2 includes an outer peripheral reinforcing rib that is provided between a mold plate and a rear-surface plate and is provided between coupling portions adjacent to each other along outer peripheries of the mold plate and the rear-surface plate. An asymmetrical opening is provided in the outer peripheral reinforcing rib, which achieves weight reduction while maintaining sufficient strength.

CITATION LIST

Patent Literature

Patent Literature 1: JP 3648178 B2
Patent Literature 2: JP 2009-66774 A

SUMMARY OF INVENTION

Technical Problem

To achieve further weight reduction of the mold platen disclosed in Patent Literature 2, it is sufficient to reduce a thickness of each of parts of the mold platen, for example, the metal plate, the rear-surface plate, and ribs. When doing so, however, rigidity of the mold plate, the rear-surface plate, or the ribs is lowered to lower necessary rigidity of the mold platen, and a region separated from a cylindrical rib, a diagonal reinforcing rib, and the outer peripheral reinforcing rib between the mold plate and the rear-surface plate may be partially deformed in a recessed shape due to a contact load from the mold.

Accordingly, an object of the present invention is to provide a mold platen that can be reduced in thickness to reduce its weight while maintaining rigidity of the mold platen. Further, an object of the present invention is to provide a mold clamping device and an injection molding device each including such a mold platen.

Solution to Problem

A method of adding a reinforcing rib at a position that is between the mold plate and the rear-surface plate and is between the adjacent diagonal reinforcing ribs has been examined. The reinforcing rib is hereinafter referred to as a longitudinal/lateral reinforcing rib. When the longitudinal/lateral reinforcing rib is provided, however, the rear-surface plate is pushed due to deformation of the mold plate through the longitudinal/lateral reinforcing rib, which causes deformation of the rear-surface plate near the longitudinal/lateral reinforcing rib. To avoid the deformation, it is sufficient to increase the thickness of the rear-surface plate in order to increase rigidity; however, this is contrary to weight reduction.

A mold platen according to the present invention includes a mold plate to which a mold is attached; a rear-surface plate provided opposite to the mold plate; coupling portions configured to be coupled to respective tie rods at four corners of the mold plate and the rear-surface plate; a cylindrical rib that is provided between the mold plate and the rear-surface plate and is located at a center part of the mold plate and the rear-surface plate; a diagonal reinforcing rib that is provided between the mold plate and the rear-surface plate and is configured to connect the cylindrical rib and each of the coupling portions; and a longitudinal/lateral reinforcing rib that is provided between the mold plate and the rear-surface plate and extends from the cylindrical rib toward a position between the adjacent coupling portions. In the mold platen, a dimension $L2$ of a part of the longitudinal/lateral reinforcing rib connected with the rear-surface plate is equal to or lower than ½ of a dimension $L1$ of a part of the longitudinal/lateral reinforcing rib connected with the mold plate, or the longitudinal/lateral reinforcing rib is connected with the mold plate and the cylindrical rib but is not connected with the rear-surface plate.

In the mold platen according to the present invention, the longitudinal/lateral reinforcing rib may be smaller in thickness than the diagonal reinforcing rib.

In the mold platen according to the present invention, the longitudinal/lateral reinforcing rib may have a constant thickness from the mold plate side toward the rear-surface plate side or may have a thickness reduced from the mold plate side toward the rear-surface plate side.

In the mold platen according to the present invention, the longitudinal/lateral reinforcing rib may have a constant thickness in a direction away from the cylindrical rib or may have a thickness which becomes thinner with increasing distance from the cylindrical rib.

In the mold platen according to the present invention, the longitudinal/lateral reinforcing rib may be provided along a first direction of the mold platen, or may be provided along the first direction of the mold platen and a second direction orthogonal to the first direction.

In the mold platen according to the present invention, in a case where the mold platen includes an outer peripheral reinforcing rib that is provided between the mold plate and the rear-surface plate and between the coupling portions adjacent to each other along outer peripheries of the mold plate and the rear-surface plate, the outer peripheral reinforcing rib preferably includes an opening asymmetrical with respect to a center line between the mold plate and the rear-surface plate.

The opening is preferably provided to make rigidity of the mold plate higher than rigidity of the rear-surface plate.

In the mold platen according to the present invention, a dimension L and the dimensions L1 and L2 preferably satisfy the following expressions:

$$L/2 \leq L1 \leq L;\text{ and}$$

$$0 \leq L2 \leq L/2,$$

where L is a dimension from an outer periphery of the cylindrical rib to an outer periphery of the mold plate along a diameter direction on outside of the cylindrical rib in the diameter direction.

The present invention provides a mold clamping device that includes paired mold platens to which a mold is attached, and a mold platen driving unit configured to move at least one of the paired mold platens forward and backward relative to the other mold platen to open/close the mold. The above-described mold platen can be used for one or both of the paired mold platens.

Further, the present invention provides an injection molding device that includes paired mold platens to which a mold is attached, a mold platen driving unit configured to move at least one of the paired mold platens forward and backward relative to the other mold platen to open/close the mold, and an injection cylinder configured to inject a molding material into a cavity of the mold. The above-described mold platen can be used for one or both of the paired mold platens.

Advantageous Effects of Invention

Since the mold platen according to the present invention includes the longitudinal/lateral reinforcing rib that connects the mold plate and the cylindrical rib, it is possible to secure rigidity even when the mold plate is reduced in thickness.

On the other hand, the longitudinal/lateral reinforcing rib is not connected to the rear-surface plate, or a connection length is small even when the longitudinal/lateral reinforcing rib is connected to the rear-surface plate. Therefore, displacement/deformation is not transferred from the longitudinal/lateral reinforcing rib to the rear-surface plate, or displacement/deformation of the rear-surface plate is suppressed small even if displacement/deformation is transferred to the rear-surface plate. According to the mold platen of the present invention, it is unnecessary to increase the thickness of the rear-surface plate to increase rigidity even when weight reduction is performed.

Further, although the load applied to the longitudinal/lateral reinforcing rib from the mold plate is transferred to the cylindrical rib, the outer periphery of which is connected to the longitudinal/lateral reinforcing rib, the cylindrical shape has high rigidity to the load from the outer peripheral side because the load from the outer peripheral side is converted into force in a circumferential direction by an arch shape (arcuate shape) in the cylindrical shape. Accordingly, it is unnecessary to increase the thickness of the cylindrical rib even when the longitudinal/lateral reinforcing rib is provided.

Furthermore, when the longitudinal/lateral reinforcing rib is provided, the mass of the mold platen is accordingly inevitably increased. In the mold platen according to the present embodiment, however, it is possible to reduce the thickness of the mold plate that occupies a large part of the mass in the mold platen. This makes it possible to achieve weight reduction of the entire mold platen while securing rigidity of the mold plate.

DESCRIPTION OF EMBODIMENTS

A mold platen according to an embodiment is described in detail below with use of an injection molding device as an example based on the embodiment illustrated in accompanying drawings. A mold clamping device of an injection molding device 1 that uses the mold platen according to the present embodiment is first described, and the mold platen is then described.

[Mold Clamping Device]

Figure 1:
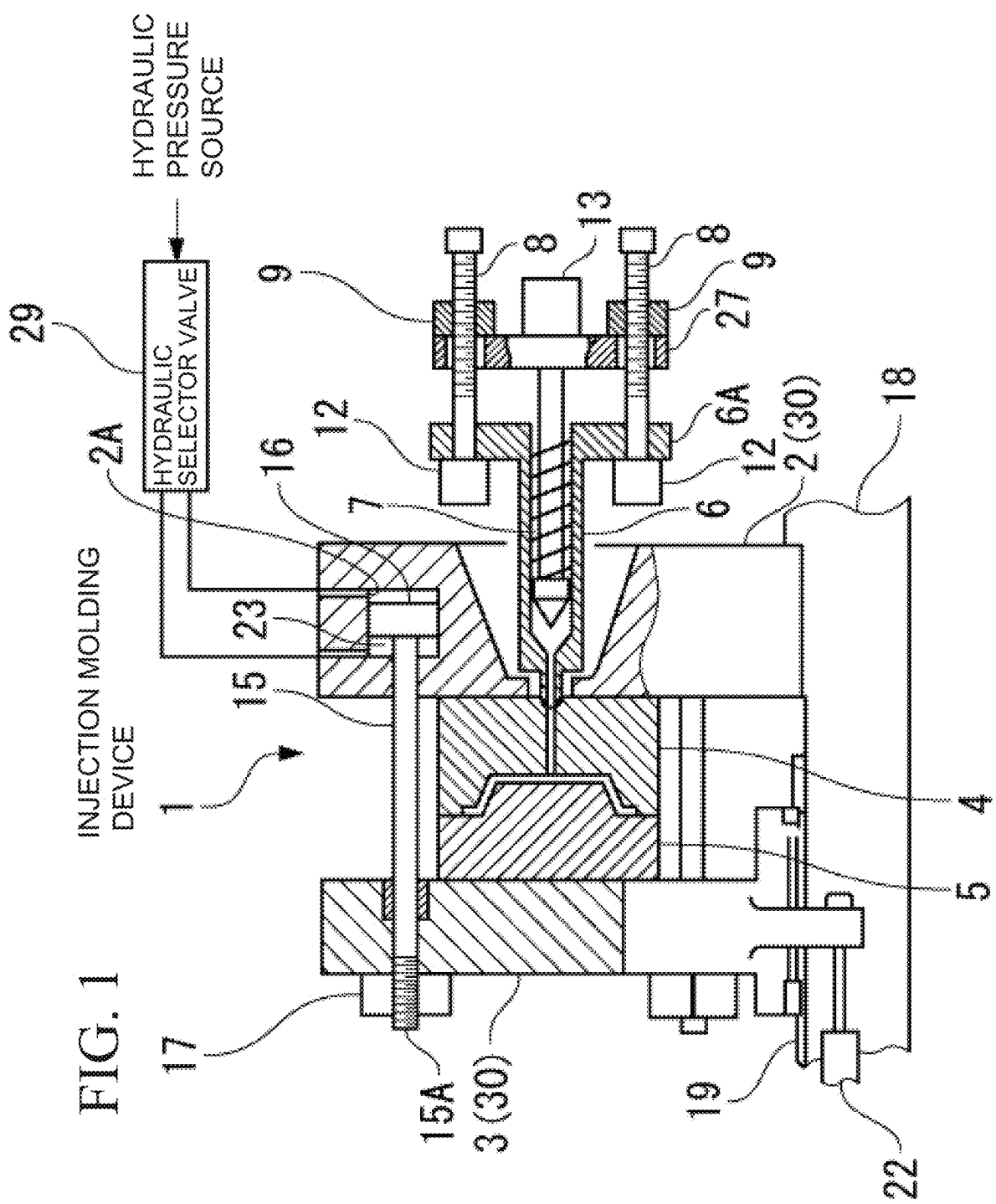
FIG. 1 is a diagram illustrating a schematic configuration of an injection molding device according to an embodiment of the present invention.

As illustrated in FIG. 1, in the mold clamping device of the injection molding device 1, a fixed mold platen 2 is attached to a base 18, and a fixed mold 4 is attached to the fixed mold platen 2. A movable mold 5 facing the fixed mold 4 is attached to a movable mold platen 3. The movable mold platen 3 is guided by a guide rail 19 laid on the base 18, and is moved to face the fixed mold platen 2 through an unillustrated linear bearing. The movable mold platen 3 is moved forward and backward with use of hydraulic driving force by a hydraulic cylinder 22 to open and close the mold.

Note that, in the present embodiment, the hydraulically-driven hydraulic cylinder 22 is exemplified as an actuator that moves the movable mold platen 3 forward and backward; however, a ball screw or the like that is driven by an electric motor such as a servo motor may be used without troubles in place of the hydraulic cylinder. Further, an example in which the guide rail 19 and the linear bearing are used as a supporting structure for the movable mold platen 3 is illustrated; however, a shoe and a sliding plate can be used without troubles in place of the guide rail 19 and the linear bearing.

A plurality of tie rods 15 are provided so as to be directly connected to respective rams 16 that slide in a plurality of mold-clamping hydraulic cylinders 2A incorporated in the fixed mold platen 2. A front end part of each of the tie rods 15 penetrates front and rear surfaces of the movable mold platen 3. A groove portion 15A is provided on the front end part of each of the tie rods 15, and a half nut 17 disposed on non-mold side of the movable mold platen 3 engages with the groove portion 15A to fix and restrict a tensile direction of each of the tie rods 15. A hydraulic selector valve 29 has a function to select hydraulic pressure to drive the mold opening/closing hydraulic cylinder 22 and the mold-clamping hydraulic cylinders 2A in response to an instruction from an unillustrated injection molding controller.

Note that, in the present embodiment, the front end part of each of the tie rods 15 engaging with the half nut 17 is formed as the groove portion 15A; however, the groove shape of the groove portion 15A may be a spiral groove such as a triangular screw and an trapezoidal screw, a parallel groove in a saw-tooth shape, or the like as long as the groove portion 15A allows for fastening of the half nut 17 and the corresponding tie rod 15 in an axis direction. Further, in the present embodiment, the example of the fixed mold platen including the mold-clamping hydraulic cylinders and the movable mold platen provided with the half nut is described; however, a fixed mold platen not including the mold-clamping hydraulic cylinders and a movable mold platen not provided with the half nut like a toggle mold clamping device can be applied to the present invention without troubles.

An injection cylinder 6 that includes a nozzle in contact with a resin inlet of the fixed mold 4 includes a frame 6A integrated with the injection cylinder 6. Paired injection drive servo motors 12 and 12 are attached to the frame 6A so as to be symmetrical with respect to a center line of the injection cylinder 6, and ball screw shafts 8 and 8 are directly connected to output shafts of the respective injection drive servo motors 12 and 12. An injection screw 7 is rotated inside a moving frame 27 by an injection screw rotational driving motor 13, and performs feeding and plasticization of the resin inside the injection cylinder 6.

Paired ball screw nuts 9 and 9 are symmetrically attached to the moving frame 27, and the ball screw shafts 8 and 8 are respectively screwed with the ball screw nuts 9 and 9. When the paired injection drive servo motors 12 and 12 are synchronously driven and rotated, the injection screw 7 is advanced and retreated in an axis direction inside the injection cylinder 6, to perform injection operation of the resin.

The injection molding device 1 rotates the injection screw 7 by the injection screw rotational driving motor 13 while advancing/retreating the injection screw 7 by the injection drive servo motors 12 and 12, thereby plasticizing and melting the resin.

The injection molding device 1 injects the molten resin into a mold cavity that is formed through clamping of the fixed mold 4 and the movable mold 5. After a molded article is cooled and solidified, the movable mold 5 is released from the coupling with the fixed mold 4 by the mold clamping, and is separated from the fixed mold 4 by actuation of the moving hydraulic cylinder 22, which enables the molded article to be demold.

Note that, in the present embodiment, the example of the ball screw driven by the electric motor has been described as the actuator of the injection device and the plasticization device; however, the hydraulically-driven hydraulic cylinder can be used as the actuator of the injection device without troubles.

[Mold Platen]

Next, a structure and the like of the fixed mold platen 2 and the movable mold platen 3 according to the present embodiment are described. In the following, each of the fixed mold platen 2 and the movable mold platen 3 is also referred to as a mold platen 30 in some cases except for a case where the fixed mold platen 2 and the movable mold platen 3 are distinguished from each other. Note that, in the following, the structure of the mold platen 30 is described with use of the fixed mold platen 2 as an example. Note that the mold platen 30 is a box-shaped mold platen that is integrally molded through casting or welding of a predetermined metal material.

Figure 2:
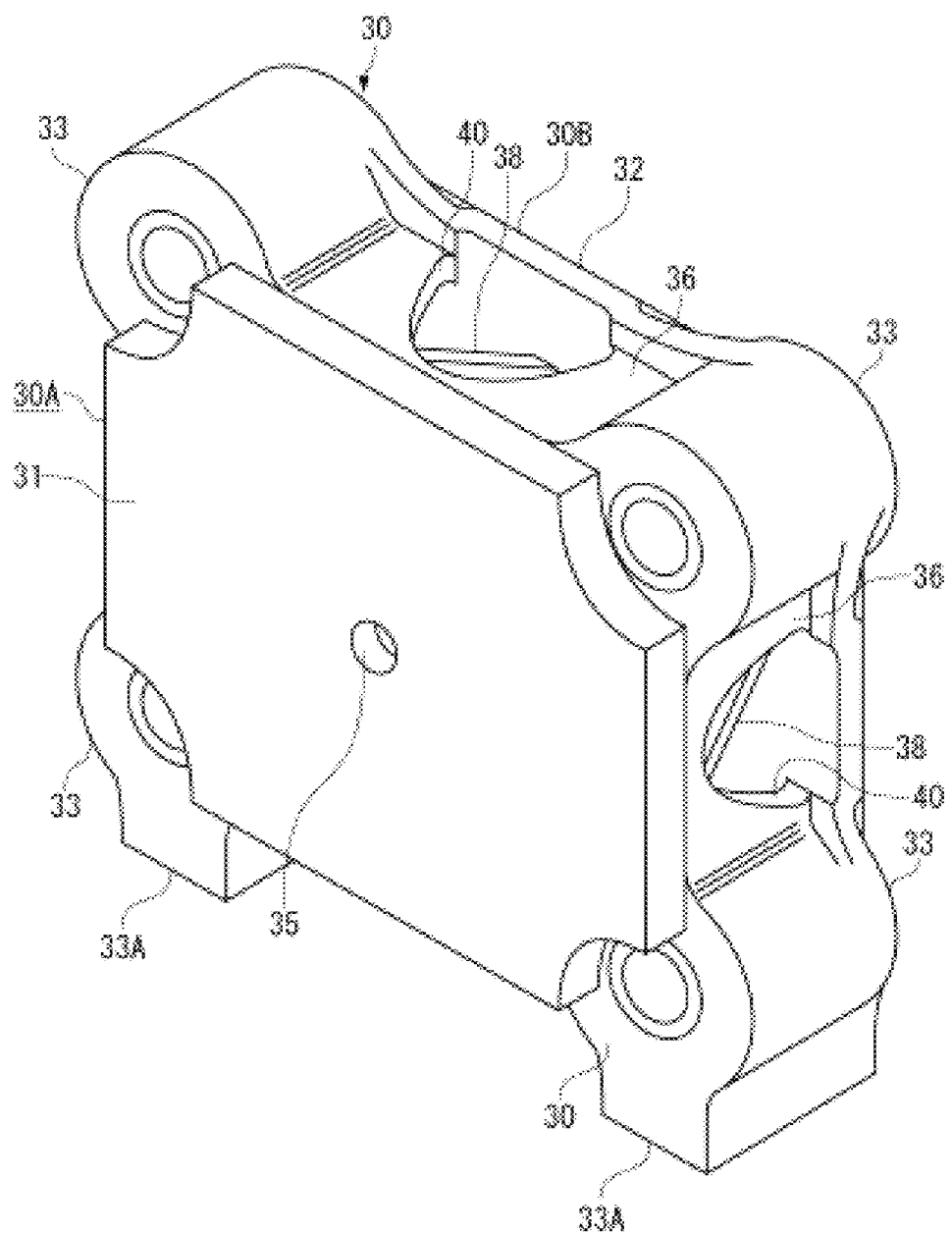
FIG. 2 is a perspective view illustrating a mold platen according to the present embodiment as viewed from mold plate side.
Figure 3:
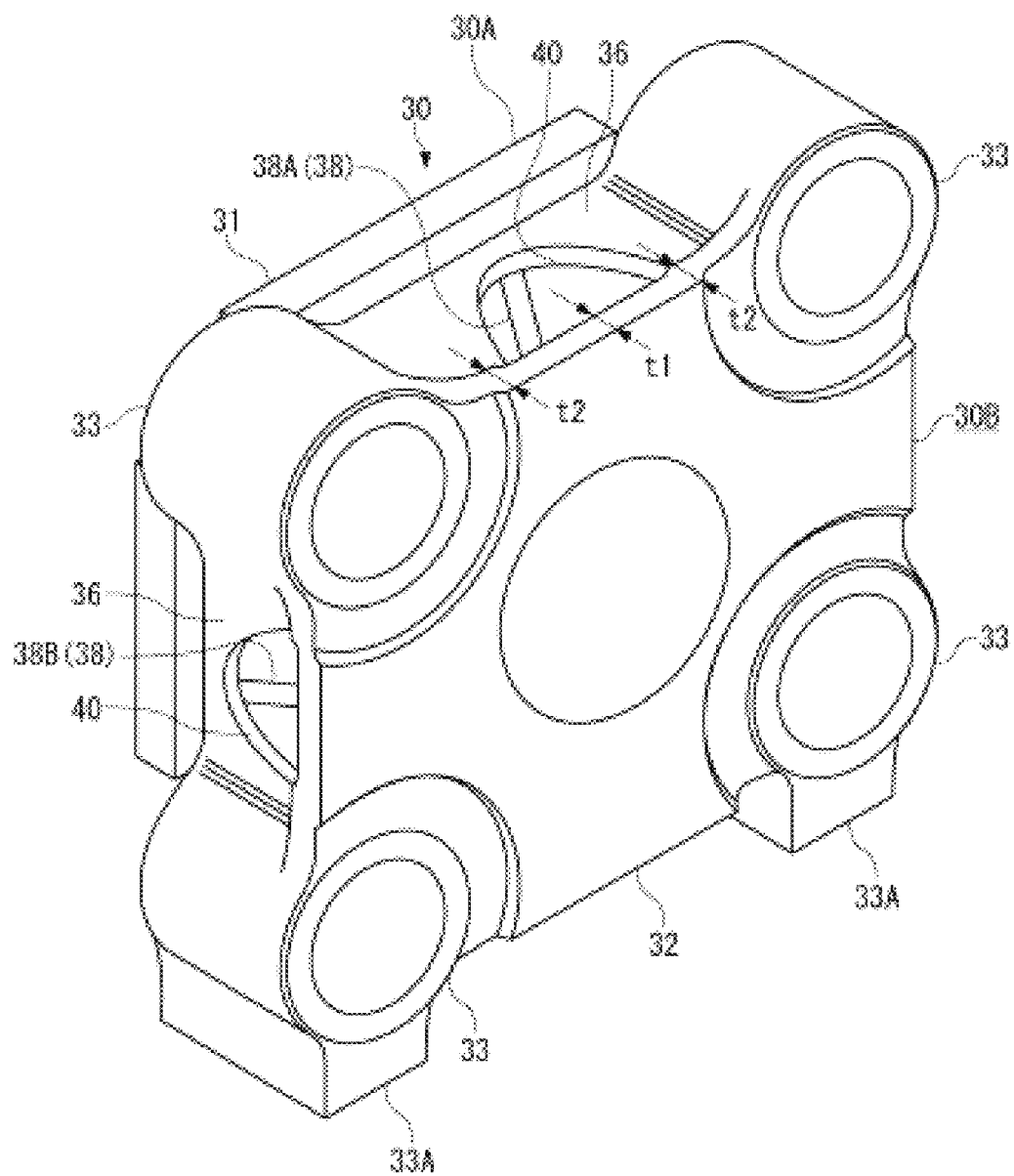
FIG. 3 is a perspective view illustrating the mold platen in FIG. 2 as viewed from rear-surface plate side.
Figure 4:
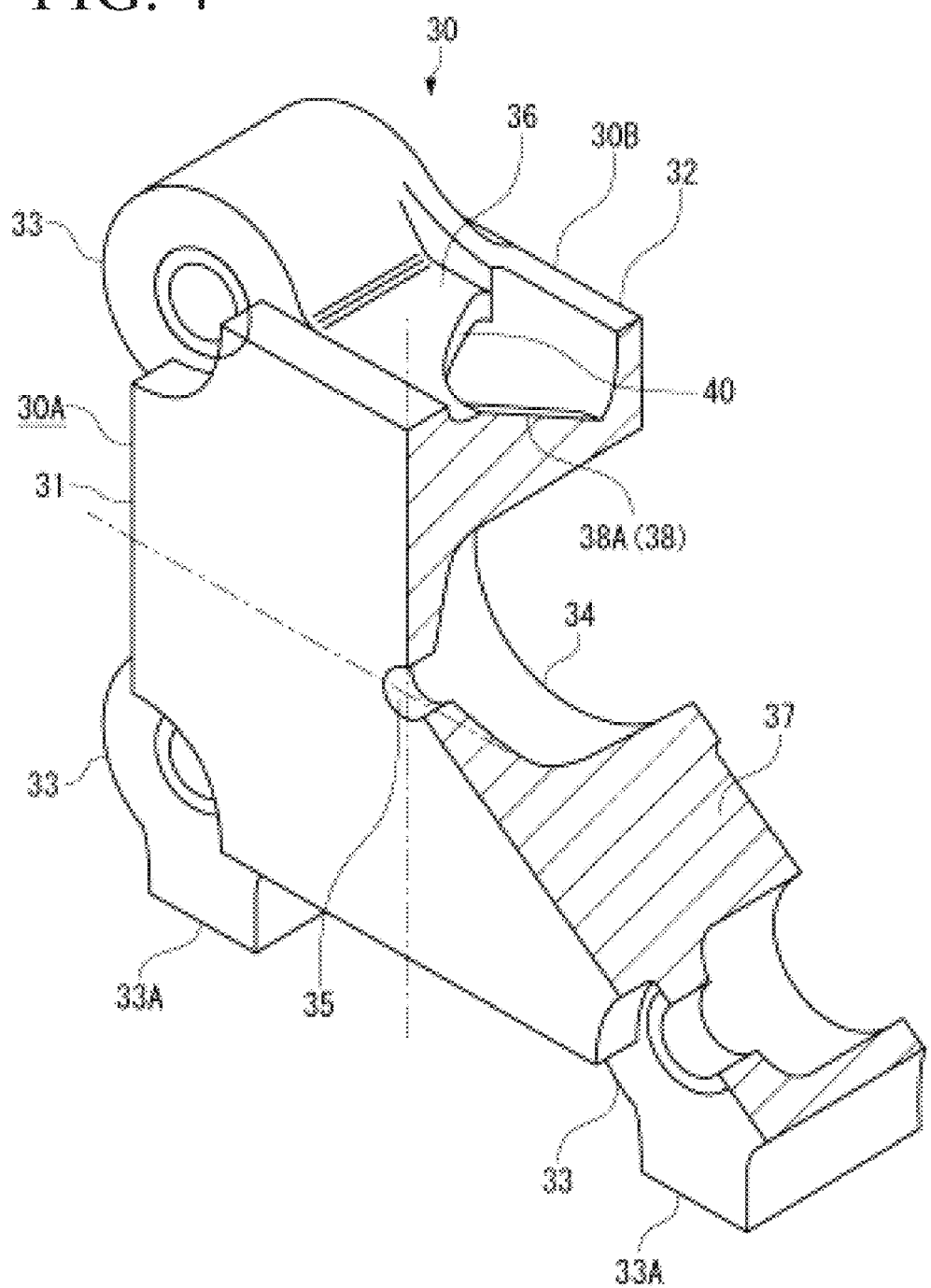
FIG. 4 is a partial cross-sectional view illustrating the mold platen in FIG. 2.
Figure 5:
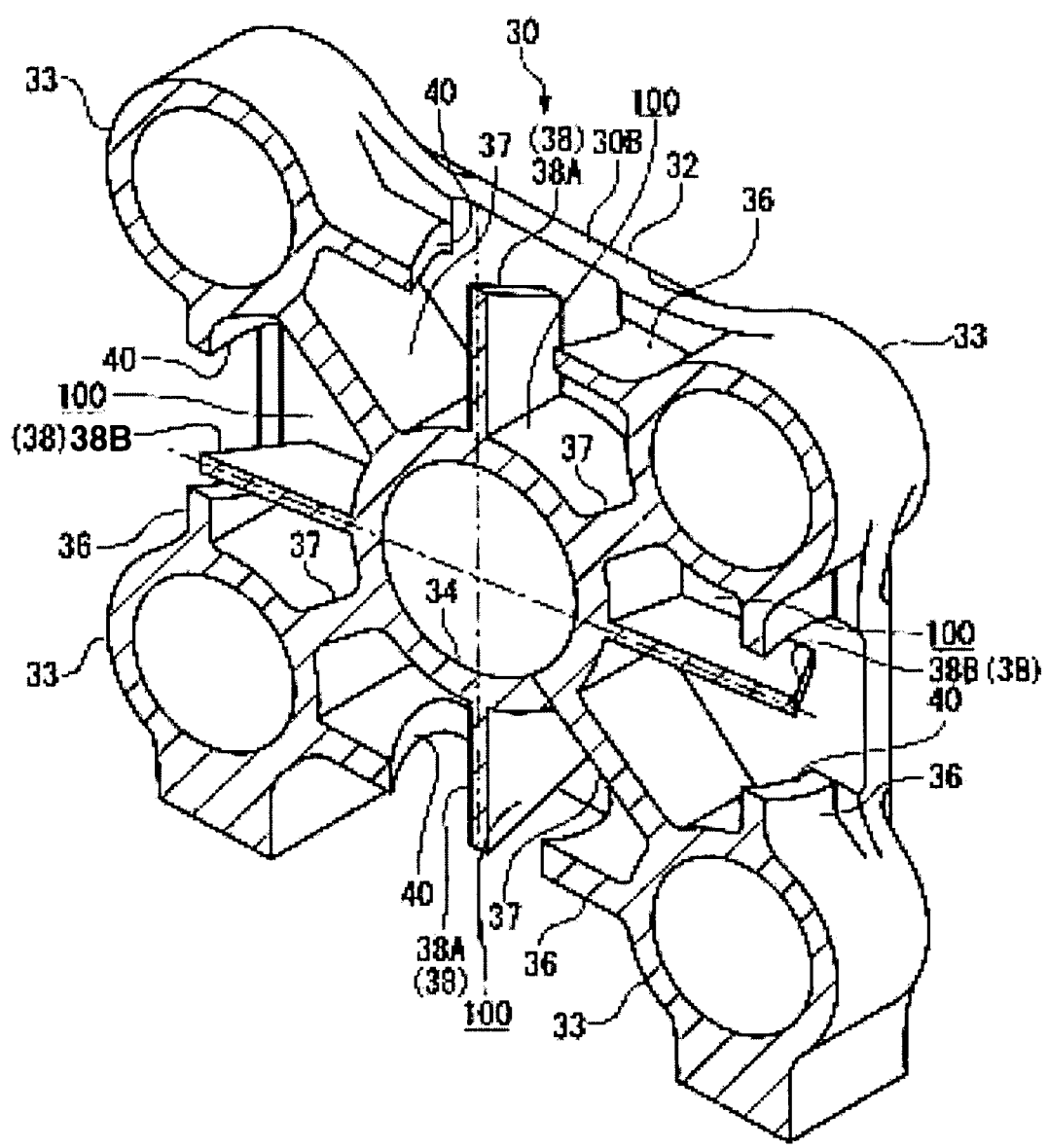
FIG. 5 is a perspective cross-sectional view illustrating ribs provided in the mold platen in FIG. 2.

As illustrated in FIG. 2 and FIG. 3, the mold platen 30 includes a mold attachment surface 30A to which the fixed mold 4 is attached, on a surface of a mold plate 31 having a predetermined thickness. A rear-surface plate 32 is disposed at a position separated by a predetermined dimension from the mold plate 31 so as to be substantially parallel to the mold plate 31. The rear-surface plate 32 forms a rear surface 30B of the mold platen 30 opposite to the mold attachment surface 30A.

As illustrated in FIG. 2 and FIG. 3, cylindrical coupling portions 33 into which the respective tie rods 15 are inserted or mold-clamping hydraulic cylinders 23 are fixed are provided at four corners of the mold plate 31 and the rear-surface plate 32. A bottom surface 33A of each of two coupling portions 33 located on lower side out of the coupling portions 33 has a flat surface to be placed on the base 18.

As illustrated in FIG. 2 to FIG. 6, a cylindrical rib 34 is provided between the mold plate 31 and the rear-surface plate 32. The cylindrical rib 34 is located at a center part of a plane of each of the mold plate 31 and the rear-surface plate 32. In the mold platen 30 used as the fixed mold platen 2, a front end part of the injection cylinder 6 illustrated in FIG. 1 is inserted into the cylindrical rib 34, and the resin can be injected from a nozzle hole 35 provided at a center part of the mold plate 31.

An outer peripheral reinforcing rib 36 is provided between the mold plate 31 and the rear-surface plate 32. The outer peripheral reinforcing rib 36 is provided along outer peripheries of the mold plate 31 and the rear-surface plate 32 so as to couple the coupling portions 33 and 33 adjacent to each other.

Further, four diagonal reinforcing ribs 37 are provided between the mold plate 31 and the rear-surface plate 32. The diagonal reinforcing ribs 37 each extend in a diagonal direction of the mold plate 31 and the rear-surface plate 32, and connect the coupling portions 33 at the four corners and the cylindrical rib 34. The diagonal reinforcing ribs 37 are arranged at an interval of about 90 degrees so as to form a cross shape. Note that the shape of the diagonal reinforcing ribs 37 is optional as long as the diagonal reinforcing ribs 37 achieve a function of coupling the coupling portions 33 at the four corners. In a case where the mold platen 30 has a laterally-long rectangular shape or a longitudinally-long rectangular shape, the diagonal reinforcing ribs 37 can be arranged at an interval of 90 degrees or more, or, 90 degrees or less so as to form a cross shape, without troubles.

Furthermore, two longitudinal reinforcing ribs 38A and two lateral reinforcing ribs 38B are provided between the mold plate 31 and the rear-surface plate 32.

The longitudinal reinforcing ribs 38A are provided along a direction connecting a middle point of an upper edge and a middle point of a lower edge (center line in vertical direction) of each of the mold plate 31 and the rear-surface plate 32. The lateral reinforcing ribs 38B are provided along a direction connecting a middle point of a left edge and a middle point of a right edge (center line in horizontal direction) of each of the mold plate 31 and the rear-surface plate 32. The longitudinal reinforcing ribs 38A are provided along the vertical direction (first direction) and the lateral reinforcing ribs 38B are provided along the horizontal direction (second direction), and the longitudinal reinforcing ribs 38A and the lateral reinforcing ribs 38B are arranged in a cross shape so as to be orthogonal to each other. Note that, in a case where it is unnecessary to distinguish the longitudinal reinforcing ribs 38A and the lateral reinforcing ribs 38B, these are collectively referred to as a longitudinal/lateral reinforcing rib 38.

The outer peripheral reinforcing rib 36, the diagonal reinforcing ribs 37, and the longitudinal/lateral reinforcing rib 38 are provided across the mold plate 31 and the rear-surface plate 32.

The outer peripheral reinforcing rib 36 includes openings 40 that are cast holes. Each of the openings 40 holds a core to form a space 100 that is surrounded by the outer peripheral reinforcing rib 36, the diagonal reinforcing ribs 37 and 37 adjacent to each other, and the cylindrical rib 34 in manufacture of the mold platen 30 by, for example, casting. Each of the openings 40 is provided on the outer peripheral reinforcing rib 36 at an intermediate position between the coupling portions 33 adjacent to each other.

Figure 6C:
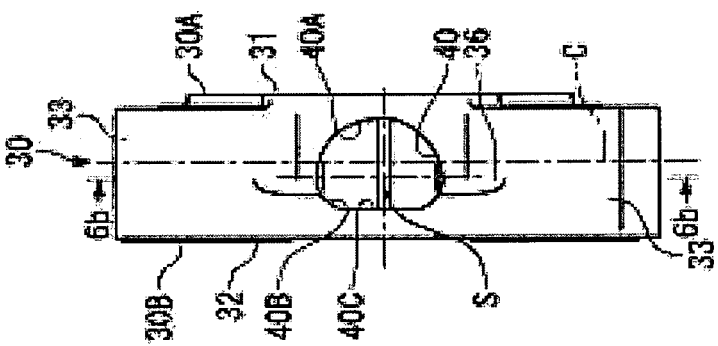
FIGS. 6A to 6C each illustrate the mold platen in FIG. 2, FIG. 6A being a side cross-sectional view of the mold platen, FIG. 6B being a half cross-sectional view illustrating the mold platen as viewed from the rear-surface plate side, and FIG. 6C being a side view of the mold platen.
Figure 6B:
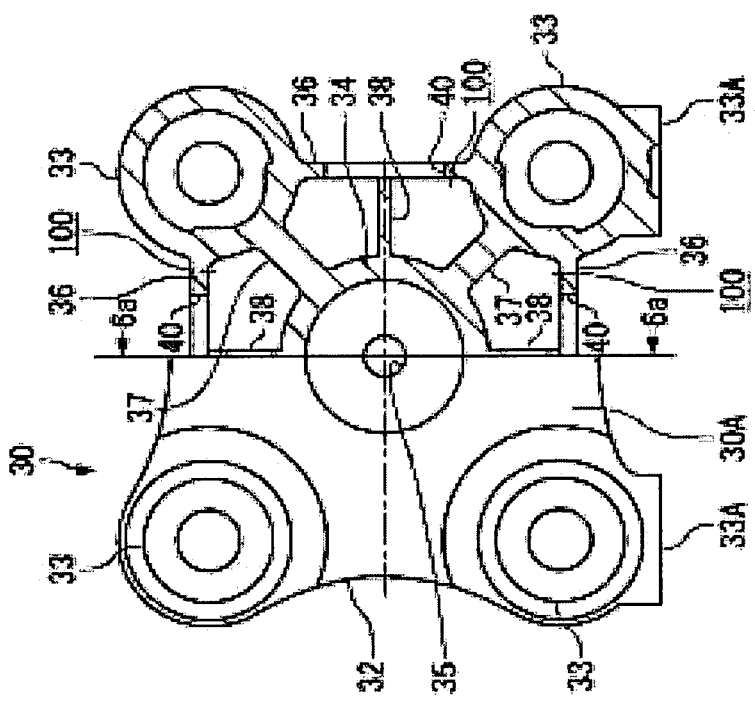
Figure 6A:
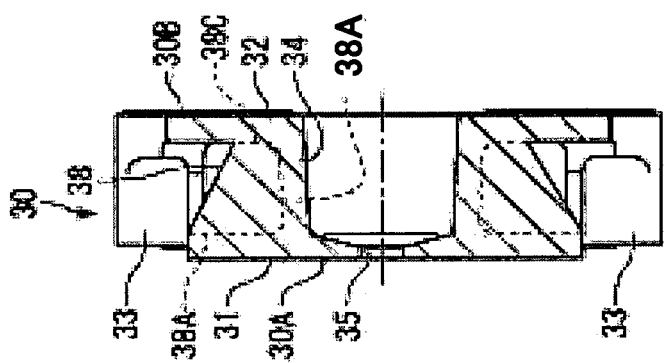

As illustrated in FIG. 6C, each of the openings 40 is set at a position in a shape asymmetrical with respect to a center line C between the mold plate 31 and the rear-surface plate 32 such that rigidity of the outer peripheral reinforcing rib 36 on the mold plate 31 side is higher than rigidity of the outer peripheral reinforcing rib 36 on the rear-surface plate 32 side.

For example, each of the openings 40 includes a semi-arcuate part 40A having a radius R2 (not illustrated) on the mold plate 31 side, and includes an arcuate part 40B having a radius R1 (not illustrated) and a linear part 40C parallel to the rear-surface plate 32 on the rear-surface plate 32 side, with a position S offset to the rear-surface plate 32 side from the center line C as a center. The radius R1 and the radius R2 satisfy R2>R1.

In each of the openings 40, a height on the mold plate 31 side is set larger than a height on the rear-surface plate 32 side with respect to a contact between the semi-arcuate part 40A and the arcuate part 40B, namely, with respect to the position S.

Further, when dimensions of the semi-arcuate part 40A and the arcuate part 40B in a direction parallel to the mold plate 31 are respectively denoted by L4 and L3 (not illustrated), the dimensions L3 and L4 satisfy L4>L3.

In the case where the openings 40 each having the above-described shape are formed, the rigidity of the outer peripheral reinforcing rib 36 is higher on the mold plate 31 side than on the rear-surface plate 32 side because an opening area of the openings 40 on the mold plate 31 side with respect to the center line C is smaller than the opening area of the openings 40 on the rear-surface plate 32 side.

Next, the longitudinal/lateral reinforcing rib 38 that is a feature of the present embodiment is described.

Figure 8A:
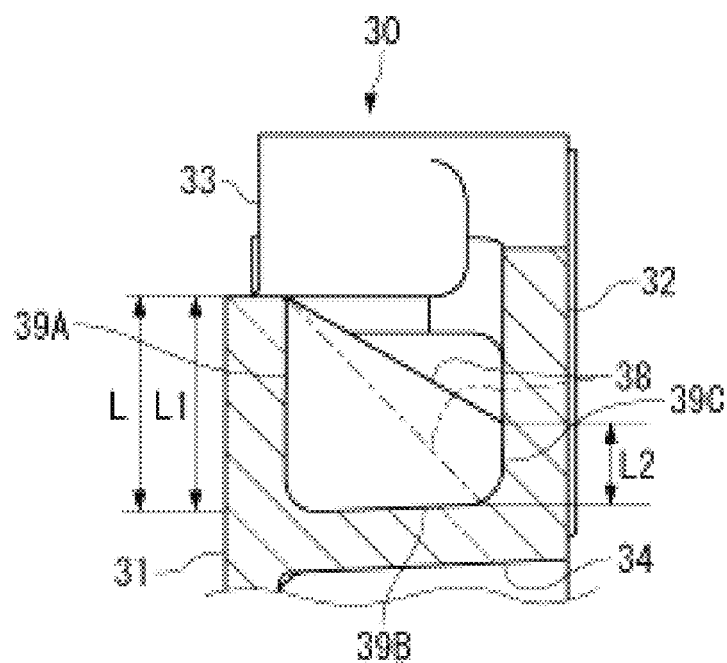
FIGS. 8A to 8B are diagrams illustrating a planar form of a longitudinal/lateral reinforcing rib of the mold platen in FIG. 2.

The longitudinal/lateral reinforcing rib 38 is integrally formed with the other parts by casting as the mold platen 30. As illustrated in FIG. 8A, the longitudinal/lateral reinforcing rib 38 includes a first connection side 39A connected to the mold plate 31, a second connection side 39B connected to the cylindrical rib 34, and a third connection side 39C connected to the rear-surface plate 32.

In the present embodiment, the first connection side 39A is continuous from an outer periphery of the cylindrical rib 34 to an outer periphery of the mold plate 31 along a diameter direction Y on outside of the cylindrical rib 34 in the diameter direction Y. The second connection side 39B is continuous over the entire length of the cylindrical rib 34 along an axis direction X of the cylindrical rib 34 sandwiched between the mold plate 31 and the rear-surface plate 32. Further, the third connection side 39C is connected to only a part of the rear-surface plate 32 on the outside of the cylindrical rib 34 in the diameter direction Y.

As illustrated in FIG. 8A, a dimension from the outer periphery of the cylindrical rib 34 to the outer periphery of the mold plate 31 along the diameter direction Y on the outside of the cylindrical rib 34 in the diameter direction Y is denoted by L. Further, a dimension of a part of the first connection side 39A connected with the mold plate 31 is denoted by L1, and a dimension of a part of the third connection side 39C connected with the rear-surface plate 32 is denoted by L2. At this time, the dimensions L1 and L2 of the longitudinal/lateral reinforcing rib 38 preferably satisfy the following first and second conditions. Note that a solid line illustrated in FIG. 8A indicates an example of L1=L and L2=L/2, and an alternate long and short dash line indicates an example of L1=L and L2=0.

<Condition of L1 and L2>

$L/2 \leq L1 \leq L$            first condition $0 \leq L2 \leq L/2$            second condition $L1/2 \geq L2$            third condition The first condition specifies that the maximum dimension of the part of the first connection side 39A connected with the mold plate 31 is L.

Figure 8B:
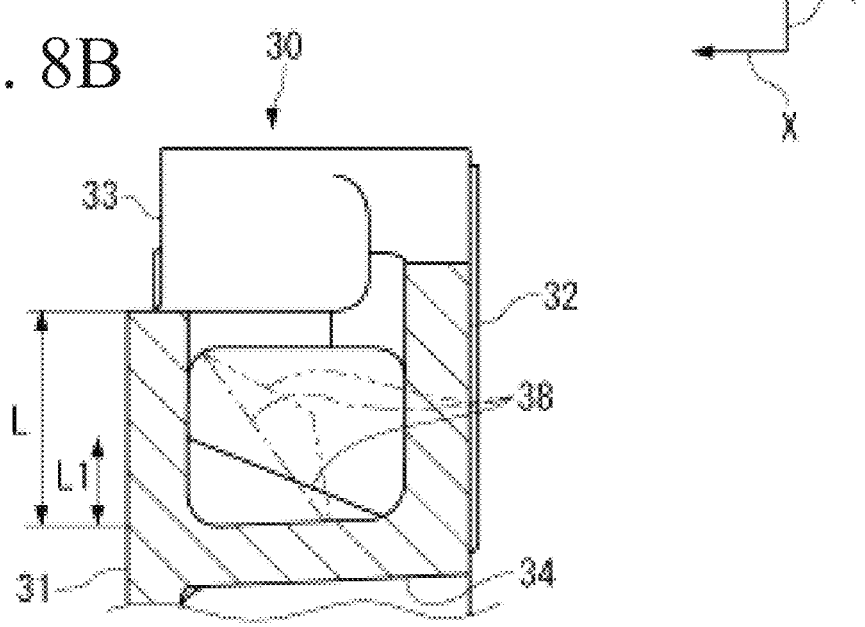

Further, the first condition specifies that the minimum dimension of the part of the first connection side 39A connected with the mold plate 31 is L/2. When the dimension L1 is made smaller than L/2, deformation of the mold plate 31 easily occurs on the outer peripheral side of the first connection side 39A when the mold plate 31 is reduced in thickness because the longitudinal/lateral reinforcing rib 38 is not located on the rear surface of the mold plate 31 on the outer peripheral side of the first connection side 39A. This is because, in this case, the function and effects to secure rigidity by the longitudinal/reinforcing rib 38 of the present invention even when the mold plate 31 is reduced in thickness are not sufficiently achieved. Note that an example of L1=L/2 is illustrated by a solid line in FIG. 8B.

The dimension L1 is preferably equal to or larger than 3L/4, and more preferably equal to L.

Next, the second condition specifies that the third connection side 39C is not connected to the rear-surface plate 32 (L2=0). In this case, even when a load is applied to the mold plate 31 through attachment of the fixed mold 4, deformation caused by the load is not transferred from the longitudinal/lateral reinforcing rib 38 to the rear-surface plate 32.

Further, the second condition specifies that, even if the third connection side 39C is connected to the rear-surface plate 32, the maximum dimension of the part of the third connection side 39C connected with the rear-surface plate 32 is L/2. In this case, a part of the rear-surface plate 32 to which deformation occurred on the mold plate 31 at the time of clamping the fixed mold 4 attached to the mold plate 31 is transferred can be limited to the vicinity of the second connection side 39B that is hardly distorted and deformed, because the longitudinal/lateral reinforcing rib 38 is coupled to the cylindrical rib 34. This makes it possible to suppress influence of the deformation on the rear-surface plate 32.

The longitudinal/lateral reinforcing rib 38 satisfies the third condition of L1/2≥L2 in addition to the preferable conditions of the first condition and the second condition. As indicated by the third condition, the longitudinal/reinforcing rib 38 is not connected to the rear-surface plate 32, or a connection length is small even when the longitudinal/reinforcing rib 38 is connected to the rear-surface plate 32. Therefore, displacement/deformation is not transferred from the longitudinal/lateral reinforcing rib 38 to the rear-surface plate 32, or displacement/deformation of the rear-surface plate is suppressed small even if the displacement/deformation is transferred to the rear-surface plate 32.

When the fixed mold 4 is attached to the mold plate 31 and is clamped, a load is applied to the mold plate 31. Deformation of the mold plate 31 caused by the load is transferred to the longitudinal/lateral reinforcing rib 38, and is further transferred from the longitudinal/lateral reinforcing rib 38 to the rear-surface plate 32, which may largely deform the entire mold platen 30. When the longitudinal/lateral reinforcing rib 38 satisfies the above-described conditions, however, force from the longitudinal/lateral reinforcing rib 38 is not transmitted to the rear-surface plate 32, or the force is suppressed small even if the force is transmitted to the rear-surface plate 32.

For example, when the longitudinal/lateral reinforcing rib 38 is configured such that the dimension L2 satisfies L2=L, a considerable amount of the load occurred on the mold plate 31 at the time of attaching and clamping the fixed mold 4 is applied to the rear-surface plate 32, which largely deforms the entire mold platen 30.

In the above description, the state where the second connection side 39B is continuous over the entire length of the cylindrical rib 34 along the axis direction X of the cylindrical rib 34 sandwiched between the mold plate 31 and the rear-surface plate 32, namely, the example in which the length of the second connection side 39B is equal to the entire length of the cylindrical rib 34 has been described; however, the present embodiment is not limited to the configuration. For example, as illustrated by an alternate long and short dash line in FIG. 8B, the length of the second connection side 39B may be smaller than the entire length of the cylindrical rib 34. A tapered shape of the longitudinal/lateral reinforcing rib 38 may be a tapered shape formed by a single liner line segment or a single arcuate line segment as illustrated by an alternate long and short dash line, or may be a tapered shape formed by a combination of a plurality of linear line segments or a combination of a plurality of arcuate line segments as illustrated by an alternate long and two short dashes line.

Figure 9A:
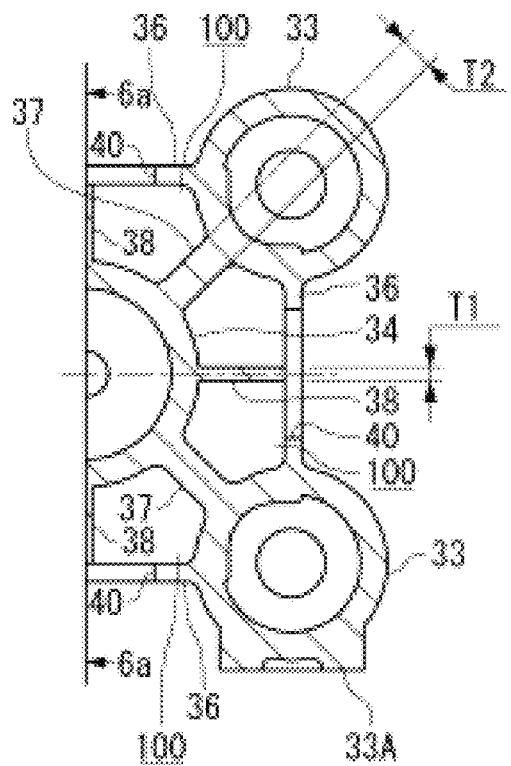
FIGS. 9A to 9B are diagrams to explain a thickness of the longitudinal/lateral reinforcing rib of the mold platen in FIG. 2.
Figure 9B:
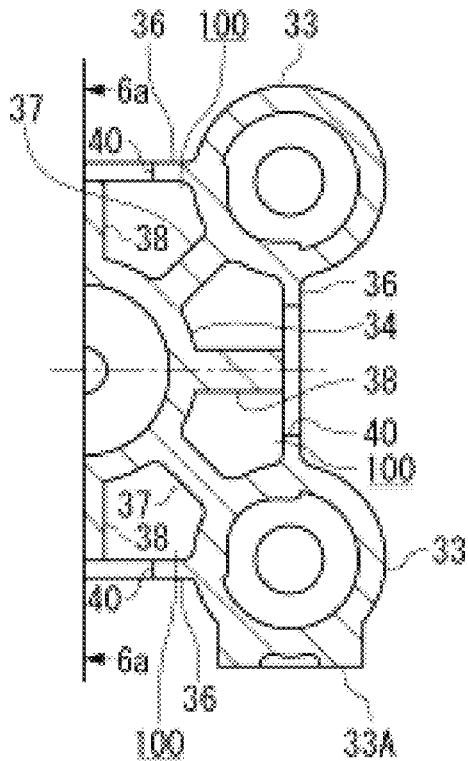

Next, the thickness of the longitudinal/lateral reinforcing rib 38 is optionally set and may be smaller than at least the thickness of each of the diagonal reinforcing ribs 37. This is based on a difference that each of the diagonal reinforcing ribs 37 is located between the mold plate 31 and the rear-surface plate 32, is a main skeleton to prevent deformation of the mold plate 31 and the rear-surface plate 32, and has a thickness dimension sufficient to take responsibility for the entire rigidity and the strength of the mold platen 30, whereas each of the longitudinal/lateral reinforcing rib 38 transfers the load of the mold plate 31 to the cylindrical rib 34 to reinforce the mold plate 31. In other words, in the present embodiment, when the thickness of each of the diagonal reinforcing ribs 37 is denoted by T2 and the thickness of the longitudinal/lateral reinforcing rib 38 is denoted by T1 as illustrated in FIG. 9A, it is possible to satisfy the following fourth and fifth conditions. In the present embodiment, although the thickness of the longitudinal/lateral reinforcing rib 38 may be made larger than the thickness of each of the diagonal reinforcing ribs 37, the thickness of the longitudinal/lateral reinforcing rib 38 is preferably made smaller than the thickness of each of the diagonal reinforcing ribs 37 because the longitudinal/lateral reinforcing rib 38 may have mass exceeding mass necessary for rigidity securement.

<Conditions of T1 and T2>

$T1 < T2$  fourth condition $T2/4 \leq T1 \leq T2/2$  fifth condition

The fourth condition specifies that the longitudinal/lateral reinforcing rib 38 is smaller in thickness than each of the diagonal reinforcing ribs 37.

Further, the fifth condition specifies that the thickness of the longitudinal/lateral reinforcing ribs 38 is preferably equal to or larger than ¼ of the thickness of each of the diagonal reinforcing ribs 37. This is because, when the thickness of the longitudinal/lateral reinforcing rib 38 is smaller than ¼ of the thickness of each of the diagonal reinforcing ribs 37, the function of the longitudinal/lateral reinforcing rib 38 cannot be sufficiently exerted.

Moreover, the fifth condition specifies that the thickness of the longitudinal/lateral reinforcing rib 38 is preferably equal to or smaller than ½ of the thickness of each of the diagonal reinforcing ribs 37. This is because, even if the thickness of the longitudinal/lateral reinforcing rib 38 exceeds ½ of the thickness of each of the diagonal reinforcing ribs 37, the reinforcing effect corresponding to increase of the weight of the longitudinal/lateral reinforcing rib 38 cannot be sufficiently achieved.

[Effects]

The effects achieved by the mold platen 30 according to the present embodiment are described below.

The mold platen 30 according to the present embodiment includes the longitudinal/lateral reinforcing rib 38 that connects the mold plate 31 and the cylindrical rib 34. Therefore, even if the mold plate 31 is reduced in thickness, the mold platen 30 can secure rigidity.

On the other hand, the longitudinal/lateral reinforcing rib 38 is not connected to the rear-surface plate 32, or the connection length is small even when the longitudinal/lateral reinforcing rib 38 is connected to the rear-surface plate 32. Therefore, deformation of the mold plate 31 is not transferred to the rear-surface plate 32 through the longitudinal/lateral reinforcing rib 38, or influence by deformation of the mold plate 31 is suppressed small even if the deformation is transferred to the rear-surface plate 32. Thus, in the mold platen 30 according to the present embodiment, it is unnecessary to increase the thickness of the rear-surface plate 32 to increase rigidity, which can eliminate increase of mass.

Further, although the load transferred to the longitudinal/lateral reinforcing rib 38 is transferred to the cylindrical rib 34 that is connected to the longitudinal/lateral reinforcing rib 38, the cylindrical shape has high rigidity to the load from the outer peripheral side because the load from the outer peripheral side is converted into force in a circumferential direction by an arch shape (arcuate shape) in the cylindrical shape. Accordingly, it is unnecessary to increase the thickness of the cylindrical rib 34 even when the longitudinal/lateral reinforcing rib 38 is provided.

When the longitudinal/lateral reinforcing rib 38 is provided, the mass is accordingly inevitably increased. According to the present embodiment, however, it is possible to reduce the thickness of the mold plate 31 that is the main skeleton of the mold platen 30 as a housing structure and occupies a large part of the mass. This makes it possible to achieve weight reduction of the mold platen 30 while securing rigidity of the mold plate 31.

Further, since inertial force of the movable mold platen 3 is reduced by weight reduction of the mold platen 30, it is possible to reduce driving force of the movable mold platen 3. This is effective to energy saving of the mold clamping device.

In addition, when the longitudinal/lateral reinforcing rib 38 is formed in a diagonal shape toward the rear-surface plate side from the mold plate side, the spaces 100 that are each surrounded by the outer peripheral reinforcing rib 36, the diagonal reinforcing ribs 37 and 37 adjacent to each other, and the cylindrical rib 34 and are segmented by the longitudinal/lateral reinforcing rib 38 can communicate with one another. As a result, the cores to form the spaces 100 are configured in an integrated structure at the time of casting the mold platen 30. Accordingly, it is not necessary to form the cores in a divided structure in the corresponding parts, and labor of molding is not changed depending on presence/absence of the longitudinal/lateral reinforcing rib 38.

Although the preferred embodiment of the present invention has been described above, the configurations described in the above-described embodiment may be selected or appropriately replaced with other configuration without departing from the scope of the present invention.

First, in the above-described embodiment, the mold platen 30 is described with use of the fixed mold platen 2 as an example; however, the longitudinal/lateral reinforcing rib 38 is applicable to the movable mold platen 3. An example thereof is described below.

Figure 7:
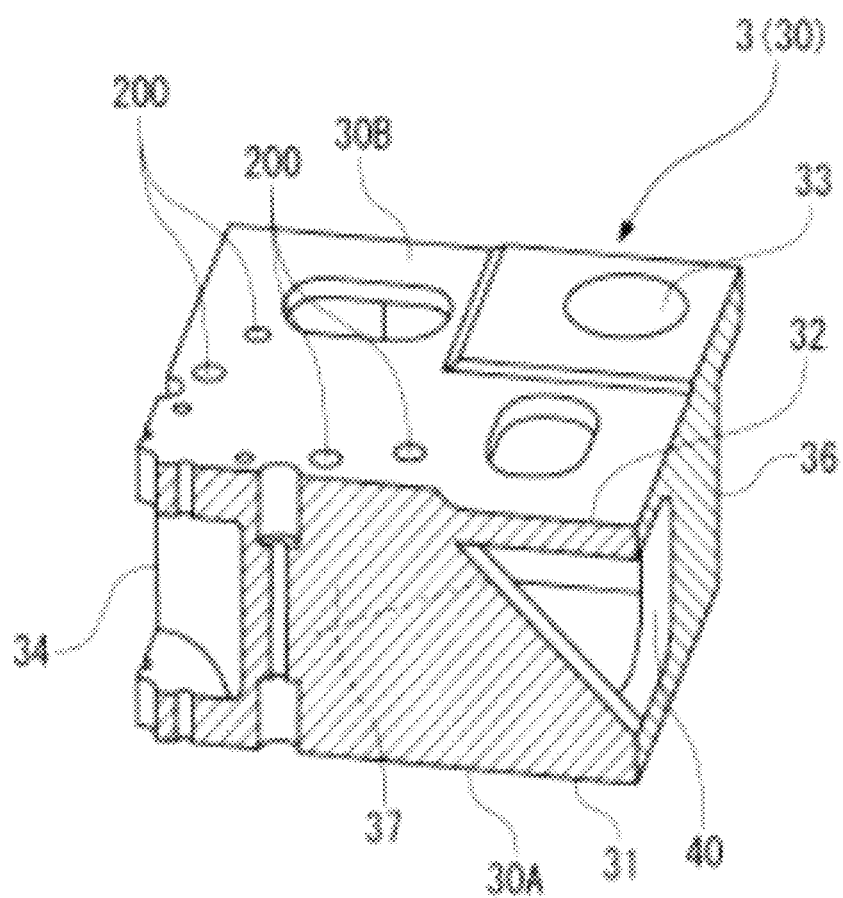
FIG. 7 is a perspective cross-sectional view illustrating an example of a movable mold platen.

For example, as illustrated in FIG. 7, in the movable mold platen 3, the mold attachment surface 30A to which the movable mold 5 is attached is formed of the mold plate 31 having a predetermined thickness, and the rear-surface plate 32 is disposed at a position separated by a predetermined dimension from the mold plate 31 so as to be substantially parallel to the mold plate 31 and forms the rear surface 30B opposite to the mold attachment surface 30A, as with the above-described mold platen 30 as the fixed mold platen 2.

Further, the coupling portions 33 are provided at the four corners of the mold plate 31 and the rear-surface plate 32, and the cylindrical rib 34 is located at the center part of each of the mold plate 31 and the rear-surface plate 32.

Further, the outer peripheral reinforcing rib 36 is provided between the mold plate 31 and the rear-surface plate 32 along the outer peripheries thereof so as to couple the coupling portions 33 and 33 adjacent to each other. In addition, the diagonal reinforcing ribs 37 each extending in the diagonal direction of the mold plate 31 and the rear-surface plate 32 are provided between the coupling portions 33 at the four corners and the cylindrical rib 34. Moreover, two longitudinal/lateral reinforcing ribs 38 are provided between the mold plate 31 and the rear-surface plate 32.

The outer peripheral reinforcing rib 36, the diagonal reinforcing ribs 37, and the longitudinal/lateral reinforcing rib 38 are provided across the mold plate 31 and the rear-surface plate 32.

Further, the outer peripheral reinforcing rib 36 includes the openings 40 each located at an intermediate position between the coupling portions 33 and 33 adjacent to each other.

The movable mold platen 3 normally includes a solid column at a center part thereof because the front end part of the injection cylinder 6 is not inserted into the movable mold platen 3, unlike the mold platen 30 used as the fixed mold platen 2. Also in the movable mold platen 3, providing the longitudinal/lateral reinforcing rib 38 makes it possible to reduce the thickness of the mold plate 31. As a result, it is possible to reduce the weight of the movable mold platen 3.

The movable mold platen 3 is moved in opening/closing of the mold. Therefore, when the weight of the movable mold platen 3 is reduced, inertial force is reduced and force necessary for the driving mechanism of the movable mold platen 3 can be reduced. Accordingly, it is extremely effective that rigidity is effectively improved while the weight of the movable mold platen 3 is suppressed as described above.

Although the longitudinal/lateral reinforcing rib 38 includes the longitudinal reinforcing ribs 38A and the lateral reinforcing ribs 38B, both of the longitudinal reinforcing ribs and the lateral reinforcing ribs are not essential for the mold platen of the present invention. For example, in a case where the mold platen has a laterally-long shape in which a length in the horizontal direction is larger than a length in the vertical direction, there is an option that the lateral reinforcing ribs are provided in the horizontal direction (first direction) but the longitudinal reinforcing ribs are not provided in the vertical direction (second direction), in consideration of rigidity of the mold platen. Likewise, in a case where the mold mainly used for molding has a laterally-long shape, even if the mold platen has a substantially square shape, there is an option that the lateral reinforcing ribs are provided in the horizontal direction (first direction) but the longitudinal reinforcing ribs are not provided in the vertical direction (second direction). In contrast, in a case where the mold platen or the mold mainly used for molding has a longitudinally-long shape in which the length in the vertical direction is larger than the length in the horizontal direction, there is an option that the longitudinal reinforcing ribs are provided in the vertical direction (second direction) but the lateral reinforcing ribs are not provided in the horizontal direction (first direction).

The above-described embodiment is premised on that the longitudinal reinforcing ribs 38A and the lateral reinforcing ribs 38B satisfy the same first to fifth conditions described above, namely, have the same specification except for the arrangement; however, the present invention is not limited thereto. For example, the specification may be different between the longitudinal reinforcing ribs 38A and the lateral reinforcing ribs 38B.

Further, the above-described longitudinal/lateral reinforcing rib 38 is premised on that the longitudinal/lateral reinforcing rib 38 has the constant thickness; however, the present invention is not limited thereto, and the thickness of the longitudinal/lateral reinforcing rib 38 may be varied. For example, the thickness may be gradually reduced from the mold plate 31 side toward the rear-surface plate 32 side, or may be gradually reduced with increasing distance from the cylindrical rib 34 side.

Further, the positions and the shapes of the openings 40 described above are not limited to those described above as long as similar effects are achievable.

For example, the shape of each of the openings 40 may be a triangular shape, a trapezoidal shape, or the like. In such a case, corners of each of the openings 40 are desirably subjected to corner rounding in order to avoid stress concentration. Further, each of the openings 40 may be formed in a circular shape, an elliptical shape, an oval shape, or the like, and may be offset to the rear-surface plate 32 side from the center line C.

Further, for example, the rear-surface plate 32 may be formed such that a thickness (t2) of a part near each of the coupling portions 33 is made larger than a thickness (t1) of a part at an intermediate position between the coupling portions 33 and 33 adjacent to each other. Note that the position of the part having the thickness (t1) and the position of the part having the thickness (t2) are illustrated in FIG. 3.

In this case, to change the thickness of the rear-surface plate 32 in the above-described manner, the part at the intermediate position between the coupling portions 33 and 33 and the part near each of the coupling portions 33 are formed in a step shape, or the thickness may be gradually increased from the part at the intermediate position between the coupling portions 33 and 33 toward the part near each of the coupling portions 33.

This makes it possible to suppress stress concentration on each of the coupling portions 33 and to uniformly disperse stress to the entire rear-surface plate 32 when the external force acting on the mold platen 30 by the hydraulic cylinder 22 and the tie rods 15 flows from the coupling portions 33 to the rear-surface plate 32.

When the mold platen 30 is manufactured by casting, core holding holes may be formed in addition to the openings 40 in order to hold the cores necessary to form the spaces 100 that are each surrounded by the outer peripheral reinforcing rib 36, the diagonal reinforcing ribs 37 and 37 adjacent to each other, and the cylindrical rib 34.

Further, a reinforcing rib that is not coupled to the rear-surface plate 32 may be provided on rear surface side of the mold plate 31. The reinforcing rib may be formed in a lattice shape or the like. The lattice-shaped reinforcing rib may be configured by intersecting a plurality of ribs extending in the horizontal direction and a plurality of ribs extending in the vertical direction with one another. This improves rigidity of the mold plate 31, thereby suppressing deformation. As a result, it is possible to suppress separation of mold mating surfaces due to deformation of the mold plate 31 and to suppress occurrence of burr of the molded article.

Although the example of the present invention targeted at the injection molding device 1 is described in the above-described embodiment, the similar mold clamping device is applicable to a die-casting machine.

REFERENCE SIGNS LIST

1 Injection molding device
2 Fixed mold platen
2A Mold-clamping hydraulic cylinder
3 Movable mold platen
4 Fixed mold
5 Movable mold
6 Injection cylinder
6A Frame
7 Injection screw
8 Ball screw shaft
9 Nut
12 Injection drive servo motor
13 Injection screw rotational driving motor
15 Tie rod
15A groove portion
16 Ram
17 Half nut
18 Base
19 Guide rail
22 Hydraulic cylinder
23 Mold-clamping hydraulic cylinder
27 Moving frame
29 Hydraulic selector valve
30 Mold platen
30A Mold attachment surface
30B Rear surface
31 Mold plate
32 Rear-surface plate
33 Coupling portion
33A Bottom surface
34 Cylindrical rib
35 Nozzle hole
36 Outer peripheral reinforcing rib
37 Diagonal reinforcing rib
38 Longitudinal/lateral reinforcing rib
38A Longitudinal reinforcing rib
38B Lateral reinforcing rib
39A First connection side
39B Second connection side
39C Third connection side
40 Opening
40A Semi-arcuate part
40B Arcuate part
40C Linear part
100 Space

The invention claimed is:

1. A mold platen, comprising:
a mold plate to which a mold is attached;
a rear-surface plate provided opposite to the mold plate;
coupling portions configured to be coupled to respective tie rods at four corners of the mold plate and the rear-surface plate;
a cylindrical rib that is provided between the mold plate and the rear-surface plate and is located at a center part of the mold plate and the rear-surface plate;
a diagonal reinforcing rib that is provided between the mold plate and the rear-surface plate and is configured to connect the cylindrical rib and each of the coupling portions; and
a longitudinal/lateral reinforcing rib that is provided between the mold plate and the rear-surface plate and extends from the cylindrical rib toward a position between the adjacent coupling portions, wherein
a dimension L2 of a part of the longitudinal/lateral reinforcing rib connected with the rear-surface plate is equal to or lower than 1/2 of a dimension L1 of a part of the longitudinal/lateral reinforcing rib connected with the mold plate, or the longitudinal/lateral reinforcing rib is connected with the mold plate and the cylindrical rib but is not connected with the rear-surface plate.

2. The mold platen according to claim 1, wherein the longitudinal/lateral reinforcing rib is smaller in thickness than the diagonal reinforcing rib.

3. The mold platen according to claim 2, wherein the longitudinal/lateral reinforcing rib has a constant thickness from the mold plate side toward the rear-surface plate side or has a thickness reduced from the mold plate side toward the rear-surface plate side.

4. The mold platen according to claim 2, wherein the longitudinal/lateral reinforcing rib has a constant thickness in a direction away from the cylindrical rib or has a thickness which becomes thinner with increasing distance from the cylindrical rib.

5. The mold platen according to claim 1, wherein the longitudinal/lateral reinforcing rib is provided along a first direction of the mold platen, or is provided along the first direction of the mold platen and a direction orthogonal to the first direction.

6. The mold platen according to claim 1, further comprising an outer peripheral reinforcing rib that is provided between the mold plate and the rear-surface plate and between the coupling portions adjacent to each other along outer peripheries of the mold plate and the rear-surface plate, wherein
the outer peripheral reinforcing rib includes an opening asymmetrical with respect to a center line between the mold plate and the rear-surface plate.

7. The mold platen according to claim 6, wherein the opening is provided to make rigidity of the mold plate higher than rigidity of the rear-surface plate.

8. The mold platen according to claim 1, wherein a dimension L and the dimensions L1 and L2 satisfy the following expressions:

$L/2 \leq L1 \leq L$; and $0 \leq L2 \leq L/2$, where L is a dimension from an outer periphery of the cylindrical rib to an outer periphery of the mold plate along a diameter direction on outside of the cylindrical rib in the diameter direction.

9. A mold clamping device, comprising:
paired mold platens to which a mold is attached; and
a mold platen driving unit configured to move at least one of the paired mold platens forward and backward relative to the other mold platen to open/close the mold, wherein
one or both of the paired mold platens are each the mold platen according to claim 1.

10. An injection molding device, comprising:
paired mold platens to which a mold is attached;
a mold platen driving unit configured to move at least one of the paired mold platens forward and backward relative to the other mold platen to open/close the mold; and
an injection cylinder configured to inject a molding material into a cavity of the mold, wherein
one or both of the paired mold platens are each the mold platen according to claim 1.

* * * * *